United States Patent
Swaminathan et al.

(10) Patent No.: US 9,973,742 B2
(45) Date of Patent: May 15, 2018

(54) METHODS AND APPARATUS FOR PREPARATION OF CASUAL STEREOSCOPIC VIDEO

(75) Inventors: Viswanathan Swaminathan, Saratoga, CA (US); Hyojin Kim, Davis, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 558 days.

(21) Appl. No.: 12/956,965

(22) Filed: Nov. 30, 2010

(65) Prior Publication Data

US 2013/0128992 A1     May 23, 2013

(51) Int. Cl.
| | |
|---|---|
| *H04N 13/00* | (2018.01) |
| *H04N 13/02* | (2006.01) |
| *H04N 19/597* | (2014.01) |
| *H04N 19/61* | (2014.01) |
| *G06T 7/73* | (2017.01) |
| *G06T 7/593* | (2017.01) |

(52) U.S. Cl.
CPC ........ *H04N 13/0239* (2013.01); *G06T 7/593* (2017.01); *G06T 7/74* (2017.01); *H04N 13/0022* (2013.01); *H04N 13/0029* (2013.01); *H04N 13/0048* (2013.01); *H04N 19/597* (2014.11); *H04N 19/61* (2014.11); *G06T 2207/10021* (2013.01); *H04N 2013/0081* (2013.01)

(58) Field of Classification Search
CPC .................... H04N 13/0048; H04N 19/00769
USPC ........... 375/240.26, 240; 275/240.01–240.29
See application file for complete search history.

(56) References Cited

U.S. PATENT DOCUMENTS

| | | | | |
|---|---|---|---|---|
| 5,416,510 | A * | 5/1995 | Lipton | H04N 19/597 348/43 |
| 6,144,701 | A * | 11/2000 | Chiang | G06T 9/004 348/43 |
| 7,463,778 | B2 * | 12/2008 | Damera-Venkata | H04N 19/597 375/E7.105 |
| 2007/0133603 | A1 * | 6/2007 | Weaver | H04L 43/0882 370/468 |
| 2007/0291941 | A1 * | 12/2007 | Socek | H04N 7/1675 380/214 |

OTHER PUBLICATIONS

R. I. Hartley, Theory and practice of projective rectification. IJCV, 1998 pp. 1-13.
A. Fusiello and L. Irsara. Quasi-euclidean uncalibrated epipolar rectification. In ICPR, 2008. pp. 1-4.
M. Pollefeys, R. Koch, and L. V. Gool. A simple and efficient rectification method for general motion. In ICCV, 1999. pp. 1-6.

(Continued)

*Primary Examiner* — Anand S Rao
*Assistant Examiner* — Tyler B Edwards
(74) *Attorney, Agent, or Firm* — Wolfe-SBMC

(57) ABSTRACT

A pair of video streams is prepared for stereoscopic display. A pair of frames is rectified. Each of the pair of frames is from a respective stream of the pair of video streams. A reduced video stream is generated by removing from one of the pair of video streams a set of correlative data that is present in or can be predicted from the other of the pair of video streams. The reduced video stream and the other of the pair of video streams are compressed for use in stereoscopic display of the reduced video stream and the other of the pair of video streams.

23 Claims, 10 Drawing Sheets

(56) References Cited

OTHER PUBLICATIONS

R.Carroll, A. Agarwala, M. Agrawala. Image warps for artistic perspective manipulation. In SIGGRAPH 2009. pp. 1-9.
M.Lang, A.Hornug, O. Wang, S. Poulakos, A. Smolic, M.Gross. Nonlinear disparity mapping for stereoscopic 3D. In SIGGRAPH 2010. pp. 1-29.

* cited by examiner

METHODS AND APPARATUS FOR PREPARATION OF CASUAL STEREOSCOPIC VIDEO

This application claims benefit of priority to U.S. Provisional Application Ser. No. 61/384,169, which was filed on Sep. 17, 2010.

BACKGROUND

Description of the Related Art

The recent popularity of three-dimensional (3D) display systems as a vehicle for the display of professionally-produced motion pictures and video games has resulted in a significant increase in demand for the ability to produce three-dimensional moving-picture video streams for display in a wide variety of market segments.

Conventionally available methods for producing three-dimensional moving-picture video streams depend on access to sophisticated camera equipment, such as stereo video cameras or synchronized multiple-video-camera sets. Such stereo video cameras or synchronized multiple-video-camera sets are capable of producing moving-picture video data sets that are configured (through the spacing of separate lenses) for three-dimensional rendering and display of moving-picture video streams. A three-dimensional visual effect results from the difference in the position of at least two lenses with respect to the subjects of the moving-picture video streams. The intensity of a three-dimensional visual effect typically increases in direct proportion to the distance between the lenses (the intra-axial distance).

A stereo video camera is a type of video camera with two or more lenses with a separate image sensor or film frame for each lens. Two moving-picture video streams or more moving-picture video streams are captured by such a video camera. Access to such sophisticated video camera equipment is limited by the cost of production. Additionally, the intensity of the three-dimensional effect is limited by the constraint placed on the interaxial distance as a result of the desire for a small camera case form factor.

A similar effect is commonly achieved with multiple video cameras, but the ability to achieve a satisfactory three-dimensional moving-picture video stream result with multiple cameras is limited by the complexity of correctly targeting the cameras on the same location and simultaneously capturing moving-picture video streams in the two cameras. Like the stereo video camera, specialized equipment is required. Additionally, however, a high level of videographic skill is needed to capture the moving-picture video stream data sets.

Figure 1:
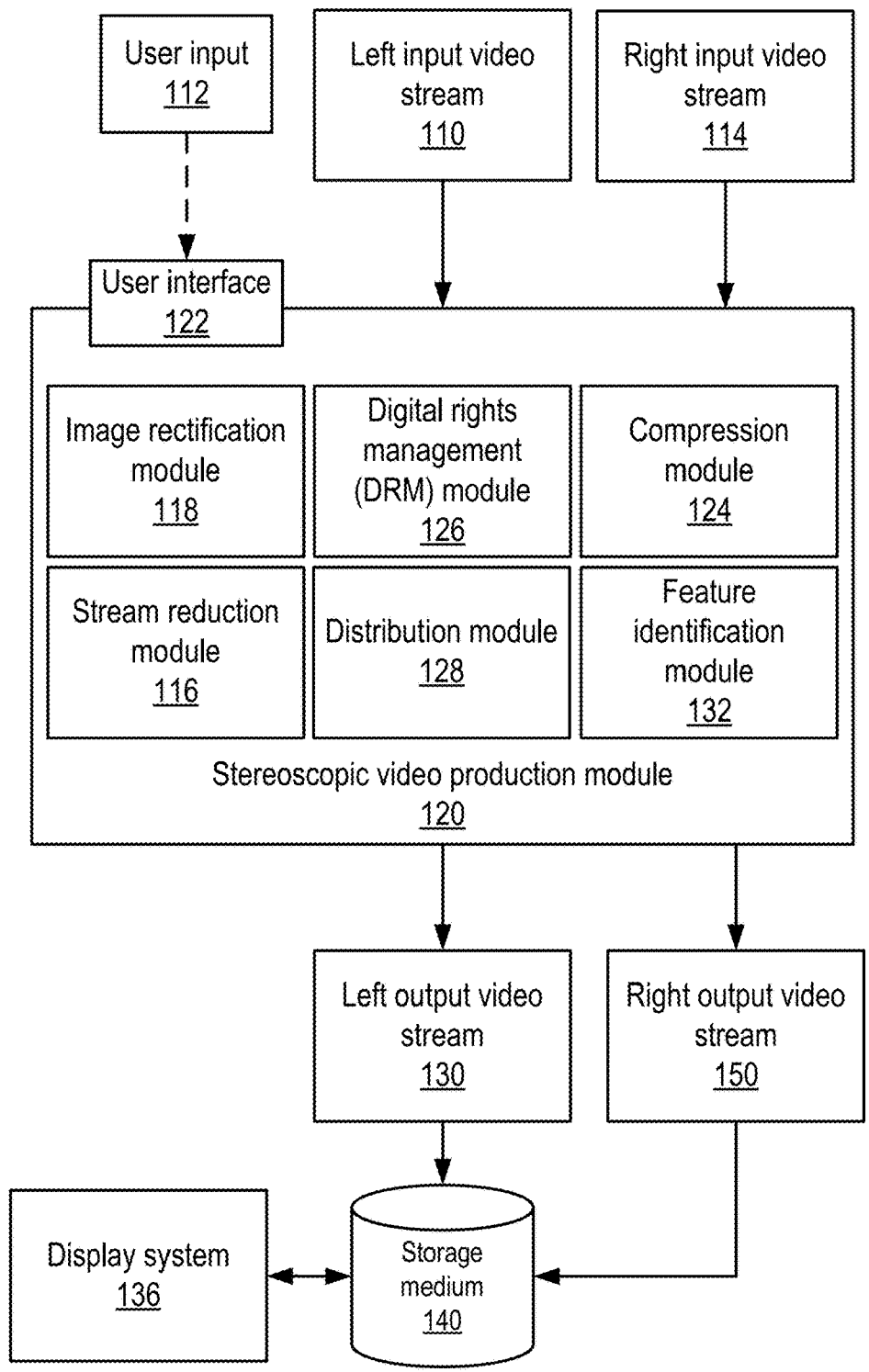
FIG. 1 illustrates a module that may be used to implement preparation of casual stereoscopic video according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

SUMMARY

A pair of video streams is prepared for stereoscopic display. A pair of frames is rectified. Each of the pair of frames is from a respective stream of the pair of video streams. A reduced video stream is generated by removing from one of the pair of video streams a set of correlative data that is present in or can be predicted from the other of the pair of video streams. The reduced video stream and the other of the pair of video streams are compressed for use in stereoscopic display of the reduced video stream and the other of the pair of video streams.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Video Rectification for Stereo Display

Various embodiments of methods and apparatus for preparation of casual stereoscopic video allow creation of a stereoscopic video stream pair suitable for three-dimensional display from a selected pair of input video data streams. The resulting video stream pair is capable of being delivered to a player in a format that includes both a primary video stream (e.g., a right channel), usable for 2-dimensional display and a secondary video stream (e.g., a left channel) implemented for complementary use with the primary video stream to provide stereoscopic video display data. Embodiments thereby allow a player to be configured to perform either two dimensional video display using the primary video stream or three-dimensional video display using both the primary and secondary video streams. In such embodiments, the player may control whether two dimensional video display using the primary video stream or three-dimensional video display using both the primary and secondary video streams is exhibited based on a variety of factors ranging from display capabilities of displaying devices, expressions of user preference, and digital rights management, among other factors.

A set of input streams is selected. The streams are rectified for stereoscopic display. At least one of the streams is then processed to reduce client processing and delivery bandwidth requirements using difference calculations. The resulting streams are then compressed and distributed, either as discrete files or as network streams, which can be delivered in real time.

During the process of rectification for stereo video display, a set of features in a selected pair of frames from the selected pair of input video data streams is identified and associated to a set of cells using a base mesh. A frame transformation is performed to at least one, and possibly both, of the selected frames. The stereo image pair of frames is generated by transforming the set of cells through a mesh-based transformation. The mesh-based transformation attempts to preserve selected properties of the features of the input image pair through the application of a set of constraints defined in terms of the selected features, including, in one embodiment, preservation of horizontal alignment. In some embodiments, additional properties of the features or the images may be used.

A calculation is made to determine whether the transformation applied to the selected set of frames is applicable to a second set of frames. If the calculation indicates that the transformation is applicable to the second set of frames, the transformation is applied to the second set of frames. If the calculation indicates that the transformation is not applicable to the second set of frames, a set of features in the second pair of frames from the selected pair of input video data streams is identified and associated to a set of cells using a base mesh. A second frame transformation is performed to at least one, and possibly both, of the second set of frames.

Difference processing is performed for each set of transformed frames. Of the two frames in each set, data in the frame from the secondary stream is removed to the extent that the data is correlative data that is present in or can be predicted from the data in the frame from the primary stream. Performance of such a difference processing operation for each set of frames in the two streams results in a primary stream that is usable for two-dimensional or three-dimensional display and a secondary stream that is usable to complement the primary stream in three-dimensional display. Preparation of such a secondary stream reduces the demands for both transmission bandwidth and processing bandwidth on the client application that performs display. Further, such a two-stream approach enables flexibility in display. A client can display the primary stream in a two-dimensional mode or both streams in a three-dimensional mode and may do so configurably on the basis of user preference or the processing and display capabilities of the client. Further, in some embodiments, digital rights management is supported to control the display of the primary stream in a two-dimensional mode or both streams in a three-dimensional mode on the basis of pricing differentiation or other differentiation factors.

Compression and distribution packaging options are also provided by some embodiments. As discussed above, because two separate streams are prepared, the streams are, in some embodiments, separately compressed and encrypted for delivery as separate files or video streams. Thus, in some embodiments, differing compression schemes can be employed. In some embodiments, a primary stream is heavily compressed to reduce transmission bandwidth requirements while a secondary stream is more lightly compressed to reduce processing requirements associated with the secondary stream.

With reference now to the figures, and in particular with reference to FIG. 1, a module that may be used to implement preparation of casual stereoscopic video according to some embodiments is illustrated. A stereoscopic video production module 120 may implement one or more of the techniques and tools for preparation of casual stereoscopic video illustrated in FIGS. 2 through 9. FIG. 10 depicts an example computer system on which embodiments of stereoscopic video production module 120 may be implemented. Stereoscopic video production module 120 receives as input one or more input video data streams, such as left input video stream 110 and right input video stream 114.

While the pair of example input video data streams described herein will be described throughout the following disclosure as left input video stream 110 and right input video stream 114, one skilled in the art will readily understand, in light of having read the present disclosure, that the spatial relationship between a pair of input video data streams need not be explicitly known in order for the techniques and tools of the disclosed embodiments to be applicable to the pair of input images. In some embodiments, left input video stream 110 and right input video stream 114 will be captured by a single computing system operating with multiple cameras. In alternative embodiments, multiple separate computing systems with cameras may be used to capture left input video stream 110 and right input video stream 114. Additionally, computer systems or other devices with cameras used to capture left input video stream 110 and right input video stream 114 may be integrated with or separate from the computer system on which stereoscopic video production module 120 executes.

Stereoscopic video production module 120 may receive user input 112 activating stereoscopic video production tool for creating a video data stream pair for stereoscopic video display. Stereoscopic video production module 120 then transforms one or both of left input video stream 110 and right input video stream 114 to generate left output video stream 130 and right output video stream 150, according to user input 112 received via user interface 122, which may include a stereoscopic video production tool. Stereoscopic video production module 120 may generate left output video stream 130 and right output video stream 150 in compressed formats for storage or transmission. Left output video stream 130 and right output video stream 150 may, for example, be stored to a storage medium 140, such as system memory, a disk drive, DVD, CD, etc. Left output video stream 130 and right output video stream 150 may also be delivered as real-time data streams over a broadcast streaming or conferencing function.

Left output video stream 130 and right output video stream 150 may also be displayed on display system 136, which may be connected to storage medium 140 as part of a single system or may be connected to storage medium 140 over a network. In some embodiments, display system 136 is configured for stereo display. Further, in some embodiments, one of left output video stream 130 and right output video stream 150 is a primary data stream and the other is a secondary data stream. In such an embodiment, display system 136 is a client that can display the primary stream in a two-dimensional mode or both streams in a three-dimensional mode and may do so configurably on the basis of user preference or the processing and display capabilities of the client. Further, in some embodiments, digital rights management is supported to control the display of the primary stream in a two-dimensional mode or both streams in a three-dimensional mode on the basis of pricing differentiation or other differentiation factors.

In some embodiments, stereoscopic video production module 120 may provide a user interface 122 via which a user may interact with stereoscopic video production module 120, for example to activate an stereoscopic video production tool and to perform a selection of left input video stream 110 and a right input video stream 114. Further, user interface 122 may allow a user to set options such as time and frame alignment and to perform feature selection as described herein. In some embodiments, user interface 122 may provide user interface elements whereby the user may select stereoscopic video production options including, but not limited to digital rights management options and compression and encoding algorithms. As discussed above, because two separate streams are prepared, and, in some embodiments, separately compressed and encrypted for delivery as separate files or video streams, a user is enabled, in some embodiments, to select different encoding, encryption and rights management options for the two separate streams.

An image rectification module 118 is assigned a frame alignment. In some embodiments in which pre-recorded video streams from separate systems are being employed for stereoscopic display, a frame alignment may be established through user interface 122, designating a frame pair including one frame from each respective video data stream as representing the same time instant in left input video stream 110 and right input video stream 114. In some embodiments, such as embodiments in which left input video stream 110 and right input video stream 114 are collected, either from cameras on a single system or from cameras attached to multiple systems, for real-time rectification and use, frame alignment may also be achieved through automated methods such as aligning time codes or time stamps in left input video stream 110 and right input video stream 114. After designating a first frame pair from left input video stream 110 and right input video stream 114 to establish frame alignment, subsequent frame pairs are identified, such that time aligned content of left input video stream 110 and right input video stream 114 is effectively assigned into frame pairs for rectification.

Image rectification module 118 applies a base mesh, such as the base mesh discussed below with respect to FIG. 4 to each frame pair from left input video stream 110 and right input video stream 114 and generates a set of cells from each frame pair from left input video stream 110 and right input video stream 114. The cells generated from each frame pair from left input video stream 110 and right input video stream 114 are associated with pixels from each frame pair from left input video stream 110 and right input video stream 114 that are contained within the boundaries of the cells as defined by application of the base mesh.

A feature identification module 132 facilitates recording of the location of features within and between cells of each frame pair from left input video stream 110 and right input video stream 114. In some embodiments, feature identification module 132 provides automatic identification of salient features. Such salient features can, in some embodiments, include points useful for defining shapes in each frame pair from left input video stream 110 and right input video stream 114. Likewise, such salient features can, in alternative embodiments, include line segments appearing in left input video stream 110 and right input video stream 114, some of which may be identified as being horizontal or vertical in left input video stream 110 and right input video stream 114. Additional line segments may be identified as being parallel between left input video stream 110 and right input video stream 114. In further alternative embodiments, feature identification module 128 records selection of each of the above-referenced salient features as they are selected or indicated by a user through user interface 122.

Image rectification module 118 further computes a transformation of the base mesh for each frame pair from left input video stream 110 and right input video stream 114 by applying one or more transformation functions to epipolar constraints associated with the horizontal alignment of selected features each frame pair from left input video stream 110 and right input video stream 114.

Image rectification module 118 generates a transformed mesh for each frame pair from left input video stream 110 and right input video stream 114 by applying the calculated transformations to the base mesh. Rectification module 132 applies the pixels of the cells from a selected one or more of the frames from left input video stream 110 and right input video stream 114 to the transformed mesh for the selected one or more of the frames from left input video stream 110 and right input video stream 114, respectively, to generate one or more transformed frames for use in left output video stream 130 and right output video stream 150. A transformed mesh and the application of cell content are discussed below with respect to FIG. 9.

In some embodiments, one left input video stream 110 and right input video stream 114 will be designated for use as a basis of a primary output video stream for use in display system 136. In a subset of such embodiments, transformation applied to the frames of the input video stream designated for use as a basis of the primary output video stream is limited. In other embodiments both left input video stream 110 and right input video stream 114 are transformed. In some embodiments, the one of left input video stream 110 and right input video stream 114 that is not selected for use as a basis of the primary output video data stream will, after transformation, be designated for use as a basis of a secondary output video stream. In such embodiments, the video stream designated for use as a basis of secondary output video stream is subjected to a stream reduction by a stream reduction module 116. The stream reduction by stream reduction module 116 employs a difference calculation to eliminate all content from the secondary output video stream that can be found in or predicted from corresponding frames of the primary output video stream.

Prior to delivery to storage medium 140, a compression module 124 applies compression algorithms to the content that becomes left output stream 130 and right output stream 150. In some embodiments, stream reduction and compression are combined in a single operation by a single module. As discussed above, because two separate streams are prepared, the streams are, in some embodiments, separately compressed and encrypted for delivery as separate files or video streams. A digital rights management (DRM) module 126 may also, in some embodiments, apply DRM features to the content that becomes left output stream 130 and right output stream 150, and options and fee regimes for the two streams may differ between the two streams. Examples of such DRM features include encryption to regulate which users may access left output stream 130 and right output stream 150. Thus, left output stream 130 and right output stream 150 may be sold under licensing agreements that allow for the shipment of both left output stream 130 and right output stream 150 to a set of users, but selectively prohibit some users from accessing left output stream 130 and right output stream 150 or provide different time limitations on the viewing of left output stream 130 and right output stream 150.

A distribution module 128 facilitates the packing of left output stream 130 and right output stream 150 as files or streaming content for distribution.

Figure 2:
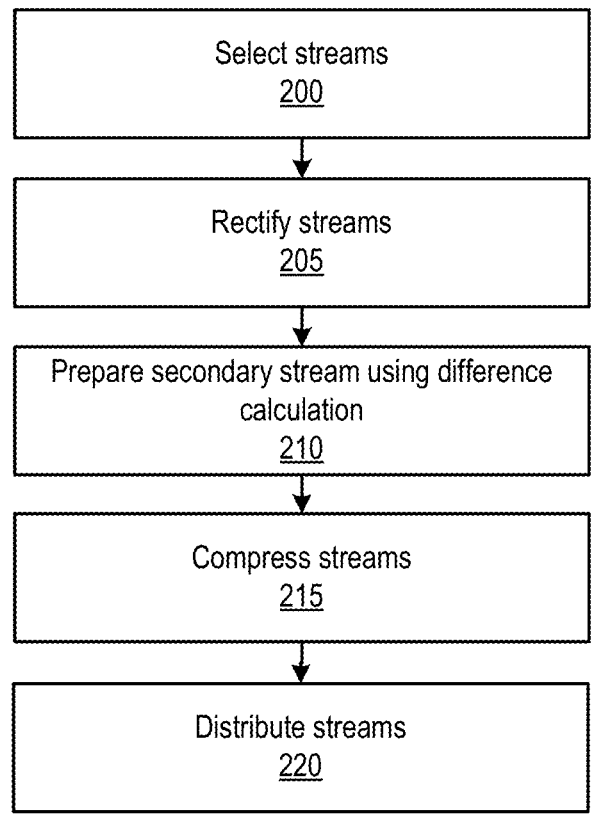
FIG. 2 depicts a high-level logical flowchart of a process for implementing preparation of casual stereoscopic video according to some embodiments.

FIG. 2 depicts a high-level logical flowchart of a process for implementing preparation of casual stereoscopic video according to some embodiments. Streams are selected for preparation of casual stereoscopic video (200). Referring briefly to FIG. 1, left input video stream 110 and right input video stream 114 form a pair of such streams for preparation of casual stereoscopic video.

Returning to FIG. 2, the streams are rectified for stereoscopic display (205). In some embodiments, rectification is performed as a frame-pair-by-frame-pair transformation as discussed below with respect to FIG. 3. An example of such a rectification is discussed below with respect to FIGS. 3-10. In addition to the example of image rectification discussed below with respect to FIGS. 3-10, in some embodiments, a rectification based on local affine transformation (mesh warping) is performed with respect to a real-time video stream. Such a mesh warping consists of a linear transformation followed by a translation. One skilled in the art will realize, in light of having read the present disclosure, that embodiments described herein support multiple methods of rectification in addition to those disclosed without departing from the scope and intent of the present disclosure. A secondary stream is prepared using a difference calculation with respect to a primary stream in order to reduce the bandwidth requirements associated with the secondary stream (210). The streams are compressed (215). In some embodiments, compression may be omitted with respect to one or both streams to conserve processing bandwidth. The streams are distributed as files on a storage medium or stream content transmitted over a network (220).

Figure 3:
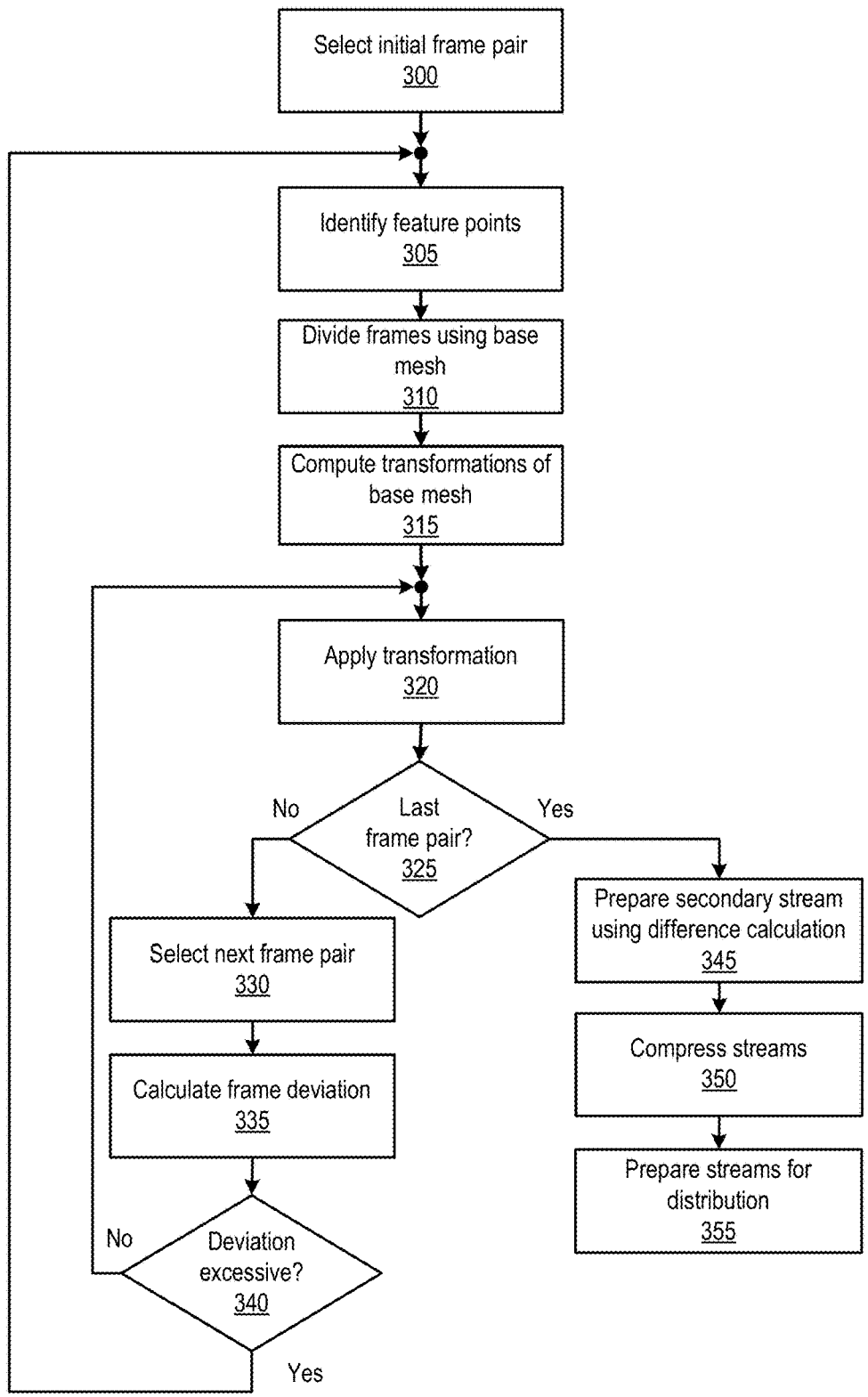
FIG. 3 depicts a second high-level logical flowchart of a process for implementing preparation of casual stereoscopic video according to some embodiments.

FIG. 3 depicts a second high-level logical flowchart of a process for implementing preparation of casual stereoscopic video according to some embodiments. An initial frame pair is selected to establish time alignment between two input data streams (300). Feature points are identified for a selected frame pair (305). Such feature points are discussed below with respect to FIG. 6. In some embodiments, these feature points include the locations of important shape-defining points in the frame pair.

Alternatively, the feature points can include endpoints of straight line segments that the user desires to see preserved as straight line segments in resulting video data streams. Other feature points can include horizontal or vertical line segments within a frame pair image that the user desires to see preserved as horizontal or vertical line segments in a resulting image. Feature points may also include line segments within the two input images that are intended to remain parallel between the two resulting images. Feature points can define areas of special interest, such as a particular item or area of frames where distortion is to be minimized to a greater extent than may be possible in the remainder of the frames.

Frames from the selected frame pair are divided into cells using a base mesh (310). The cells generated using the base mesh are associated with pixels from the respective frames that are contained within the boundaries of the cells as defined by application of the base mesh. Association of pixels with particular cells is discussed below with respect to FIG. 5. Transformations of the base mesh are computed for the frames (315) using a function designed to preserve horizontal alignment of the feature points identified in block 305. The transformation computed in block 315 is applied to one or more of the frame pair by distorting the base mesh to generate a transformed mesh and applying to the base mesh the cell contents of the one or more frames that are selected for transformation, in a manner analogous to texture mapping. The transformation results in a transformed frame, which is discussed below with respect to FIG. 10.

A determination is made as to whether the process has executed with respect to a last frame pair for the two input streams (325). If the process has not arrived at a last frame pair for the two input streams, a next frame pair is selected (330). A frame deviation is calculated (335). The frame deviation measures the degree to which feature points present in a previously processed frame pair are located at different points in the newly selected frame pair.

If the frame deviation is excessive (e.g., if the frame deviation exceeds a pre-determined threshold), then the process returns to block 305, which is described above. If, by contrast, the frame deviation is determined not to be excessive, the process returns to block 320, which is also described above.

Returning to block 325, if it is determined that the process has executed with respect to a last frame pair for the two input streams, a secondary stream is prepared using a difference calculation (345). As discussed above, a secondary video stream designated for use as a basis of secondary output video stream is subjected to a stream reduction by a stream reduction module. The stream reduction employs the difference calculation to eliminate all content from the secondary output video stream that can be found in or predicted from corresponding frames of the primary output video stream.

Compression is then performed (350) to both streams and the streams are prepared for distribution (355). Preparation for distribution can include encryption, assignment of DRM features, packaging into files, storage on a server, or organization into a data structure for streamed-video delivery. As discussed above, because two separate streams are prepared, the streams are, in some embodiments, separately compressed and encrypted for delivery as separate files or video streams with different compression, encryption and access options.

In alternative embodiments, particularly embodiments in which real-time streaming or teleconferencing applications are provided, operations described with respect to blocks 345-355 are performed with respect to each frame pair for the pair of input streams or to small groups of frame pairs. In such embodiments, the operation described with respect to block 325 may be omitted.

Figure 4:
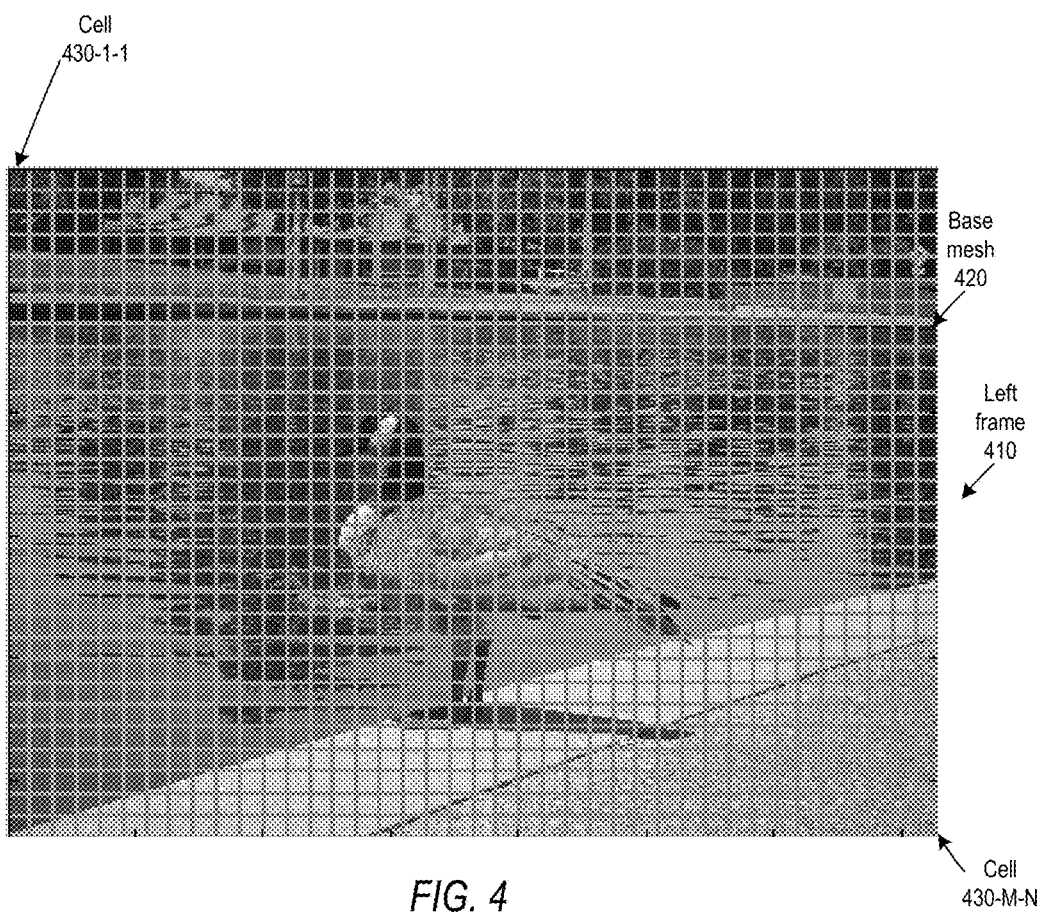
FIG. 4 depicts assignment of a base mesh for use in transformations during a process for implementing preparation of casual stereoscopic video according to some embodiments.

FIG. 4 depicts assignment of a base mesh for use in transformations during a process for implementing preparation of casual stereoscopic video according to some embodiments. In FIG. 4, a left frame 410 from a left input video stream is divided into 1200 cells by a 30 cell×40 cell base mesh 420. Each of cells 430-1-1-430-M-N contains a group of pixels of content of left frame 410. While 1200 square cells are portrayed in the embodiment depicted in FIG. 4, one skilled in the art will realize that the number of cells used for rectifying a particular frame pair will vary between embodiments, as will the shape of cells 430-1-1-430-M-N. In some embodiments, both the number and shape of cells 430-1-1-430-M-N will be user configurable or otherwise adaptable to the particular conditions of a given input video stream pair or frame pair.

Figure 5:
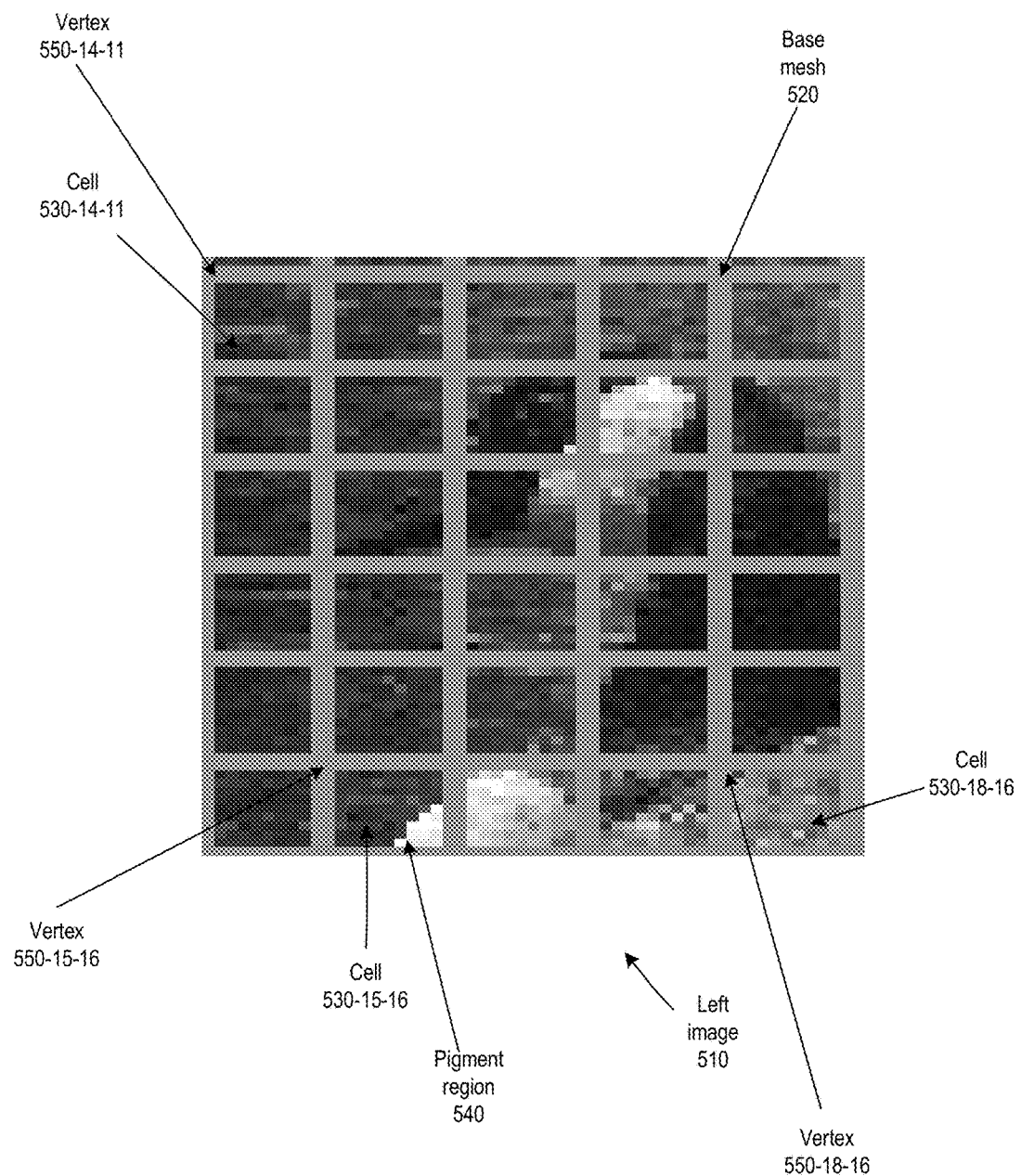
FIG. 5 illustrates details of a base mesh for use in transformations during a process for implementing preparation of casual stereoscopic video according to some embodiments.

FIG. 5 illustrates details of a base mesh for use in transformations during a process for implementing preparation of casual stereoscopic video according to some embodiments. As discussed above with respect to FIG. 5, a left frame 510 from a left input video stream is presented with a base mesh 520 defining a group of cells 530-14-11-530-18-16. Each cell is defined by one of a group of vertices 550-14-11-550-18-16. Features, such as pigment region 540, are defined in terms of their location within the cell.

Constraints Supporting Image Rectification for Stereoscopic Video Production

Figure 6:
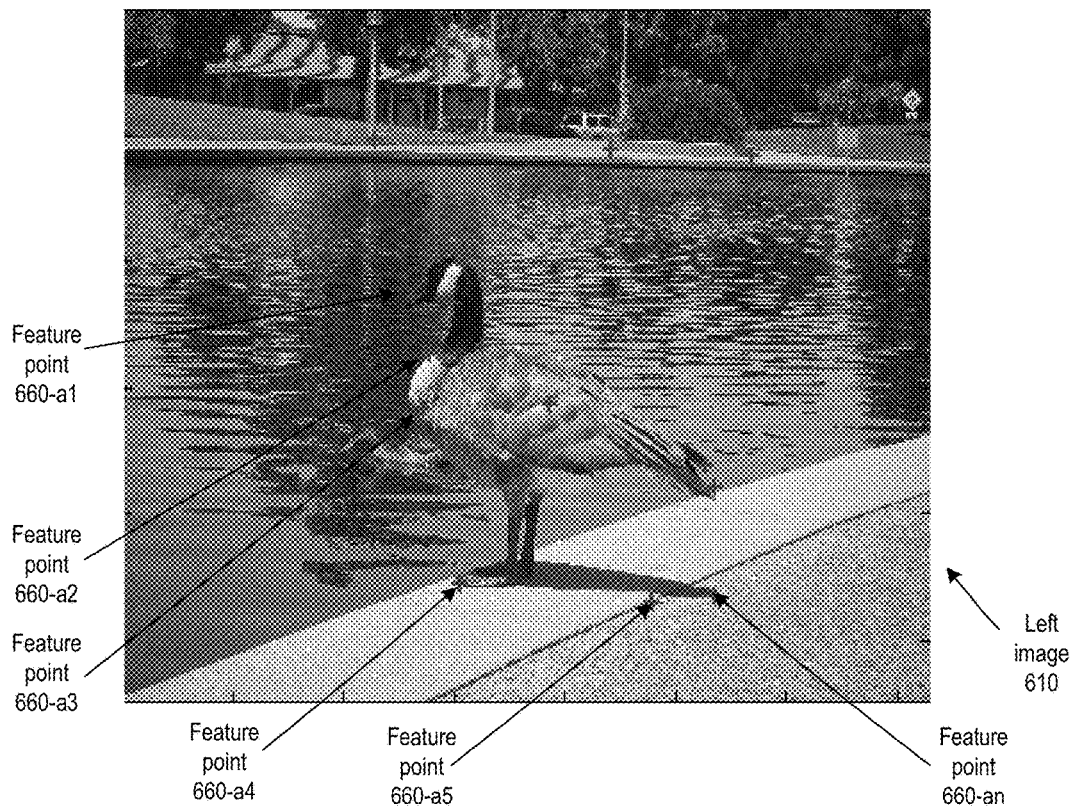
FIG. 6 depicts results of an example of a feature recognition operation that can be used in the context of implementing preparation of casual stereoscopic video according to some embodiments.

FIG. 6 depicts results of an example of a feature recognition operation that can be used in the context of implementing preparation of casual stereoscopic video according to some embodiments. FIG. 6 depicts a left frame 610 from a left input video stream with feature points 660a1-660an. In an input frame pair from a pair of video streams, a corresponding set of feature points will be identified in a right frame from a right input video stream, and one or more of the frames will be adjusted or transformed to provide horizontal alignment between feature points 660a1-660an and respective ones of the corresponding set of feature points in the right frame from a right input video stream.

In some embodiments, some of feature points 660a1-660an as well as their respective ones of the corresponding set of feature points in the right frame from a right input video stream, are selected or indicated by a user through a user interface. In some embodiments, feature points 660a1-660an as well as their respective ones of the corresponding set of feature points in the right frame from a right input video stream, are automatically identified through the use of salient feature detection algorithms embodied within a feature identification module. Matching points can be detected using local salient point detectors such as SIFT.

Example Embodiments of Methods for Stereoscopic Video Production

Figure 7:
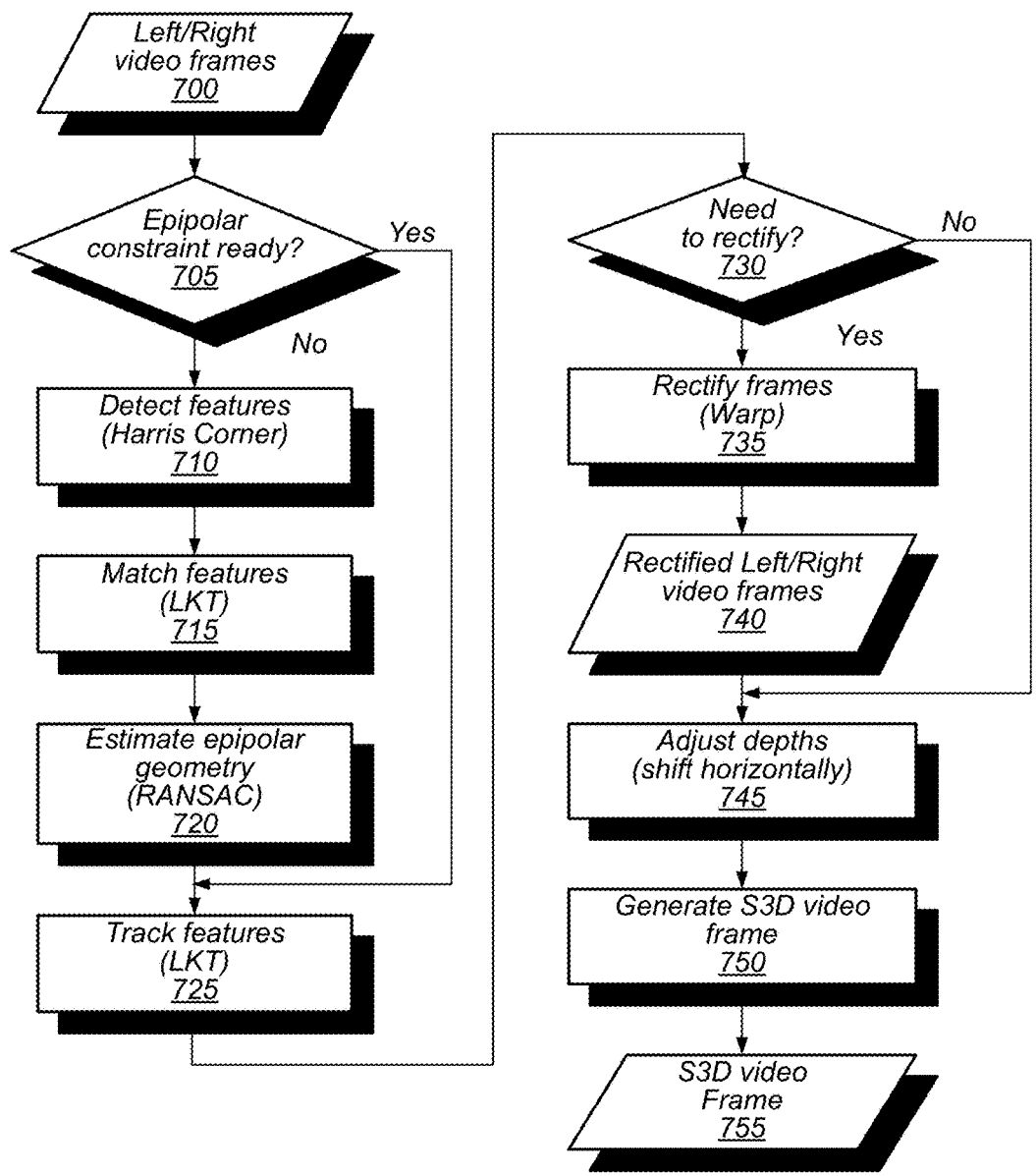
FIG. 7 illustrates results of an example of a third high-level logical flowchart of a process for implementing frame preparation of casual stereoscopic video according to some embodiments.

FIG. 7 illustrates results of an example of a third high-level logical flowchart of a process for implementing frame preparation of casual stereoscopic video according to some embodiments. The process begins with a left video frame and a right video frame (700). A determination is made as to whether epipolar constraints are ready (705). If the epipolar constraints are ready, the process proceeds to block 725, which is described below. If the epipolar constraints are not ready, then features are detected in each of the left and right frames (710). One example of an applicable feature identification system is the Harris Corner algorithm, discussed at C. Harris and M. Stephens (1988). "A combined corner and edge detector". Proceedings of the 4th Alvey Vision Conference. pp. 147-151. http://www.cis sit.edui-cnspci/references/dip/harris1988.pdf.

The features are matched between the left and right frames (715). One example of an applicable feature matching system is the LKT algorithm, discussed at Bruce D. Lucas and Takeo Kanade. *An Iterative Image Registration Technique with an Application to Stereo Vision*. International Joint Conference on Artificial Intelligence, pages 674-679, 1981 and Carlo Tomasi and Takeo Kanade. *Detection and Tracking of Point Features*. Carnegie Mellon University Technical Report CMU-CS-91-132, April 1991.

Epipolar geometry is then estimated (720). One example of an applicable feature matching system is the RANSAC algorithm, discussed at Martin A. Fischler and Robert C. Bolles (June 1981). "Random Sample Consensus: A Paradigm for Model Fitting with Applications to Image Analysis and Automated Cartography". *Comm. of the ACM* 24: 381-395.

Features are then tracked across the frames (725). One example of an applicable feature tracking system is the LKT algorithm, discussed at Carlo Tomasi and Takeo Kanade. *Detection and Tracking of Point Features*. Carnegie Mellon University Technical Report CMU-CS-91-132, April 1991.

A determination is made as to whether the frames need to be rectified (730). If no rectification is needed, then the process proceeds to block 745, which is described below. If the frames do require rectification, a rectification process is performed (735), a warping of the frames, such as that described below with respect to FIG. 9, resulting in a pair of a left and right rectified video frames (740), as described above. Depth is adjusted through a horizontal shift of the frames (745). Stereoscopic 3D video frames are then generated (750), resulting in stereoscopic video frame output (755).

Figure 8:
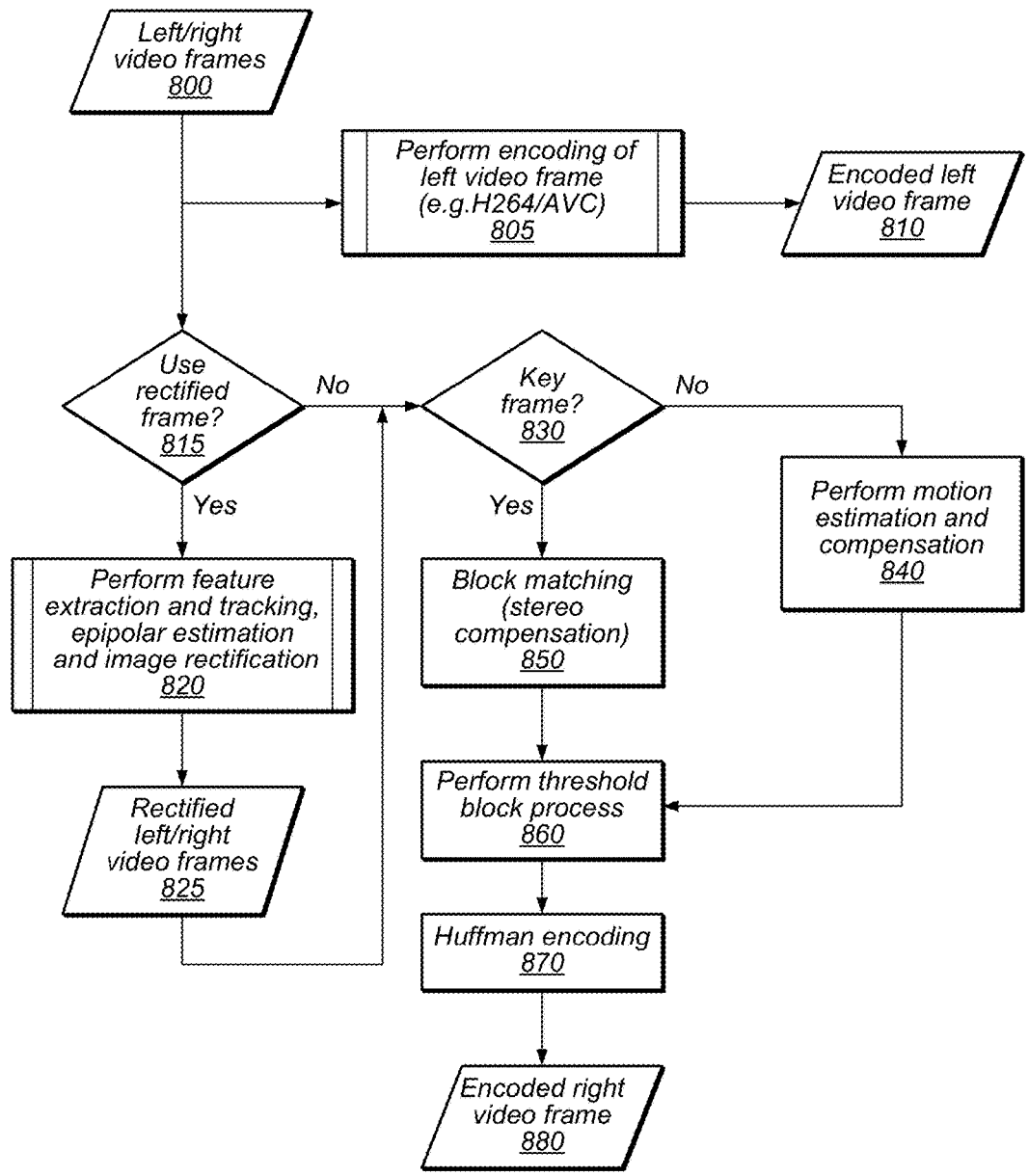
FIG. 8 depicts an example of a fourth high-level logical flowchart of a process for implementing preparation of casual stereoscopic video according to some embodiments.

FIG. 8 depicts a fourth high-level logical flowchart of an example process for implementing preparation of casual stereoscopic video according to some embodiments. The process begins with a left video frame and a right video frame (800). In an environment in which the left video input stream is selected for preparation as the basis of a primary video output stream, encoding is performed (805) with respect to a frame of the left video stream, resulting in an encoded left video frame (810). While encoding algorithms will vary between embodiments, suitable algorithms include H264 and AVC encoding, information on which can be found at Thomas Wiegand, Gary J. Sullivan, Gisle Bjontegaard, and Ajay Luthra, "Overview of the H.264/AVC Video Coding Standard", in IEEE Transactions on Circuits and Systems for Video Technology (2003).

Turning now to the right video frame, a determination is made as to whether to use a rectified video frame (815). If a determination not to use a rectified video frame is made, then the process proceeds to block 830, which is discussed below. If a determination is made to use a rectified video frame, a process of feature extraction and tracking, epipolar estimation, and image rectification is performed (820), using techniques discussed above with respect to FIG. 7. The process of feature extraction and tracking, epipolar estimation, and image rectification results in a rectified left and right video frame pair (825).

A determination is made as to whether the current frame pair represents a key frame (830). In one embodiment, the determination with respect to whether the frame is a key frame is a determination of whether the motion depicted in the frame exceeds a threshold value. If the current frame represents a key frame, then the process proceeds to block 850, which is described below. If the current frame does not represent a key frame, then motion estimation and motion compensation are performed (840). The process then proceeds to block 860, which is described below. One skilled in the art will realize, in light of having read the present disclosure, that some alternative embodiments also perform block matching after motion estimation and compensation (thereby transiting in the diagram to block 850 rather than 860) without departing from the scope and intent of the present disclosure.

Returning to block 830, if the current frame does not represent a key frame, then block matching for stereo compensation is performed (850). A threshold block process is performed (860). In a threshold block process, compression is improved by reducing to zero the color value of pixels that are close to a color value of zero. For example, shades of dark grey or less-than-total black are converted to black. Huffman encoding is performed (870). Information on Huffman encoding can be found at D. A. Huffman, "A Method for the Construction of Minimum-Redundancy Codes", Proceedings of the I.R.E., September 1952, pp 1098-1102. An encoded right video frame is then complete (880).

Figure 9:
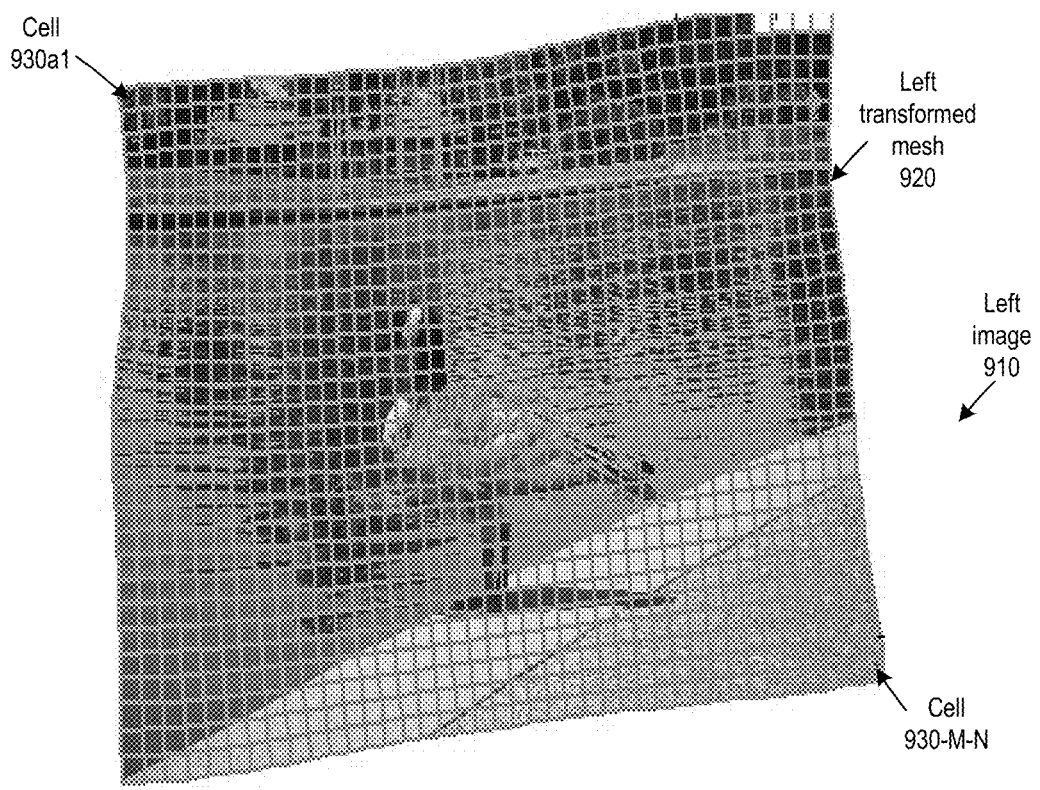
FIG. 9 illustrates results of an example mesh-based transformation operation that can be used in the context of implementing preparation of casual stereoscopic video according to some embodiments.
Figure 10:
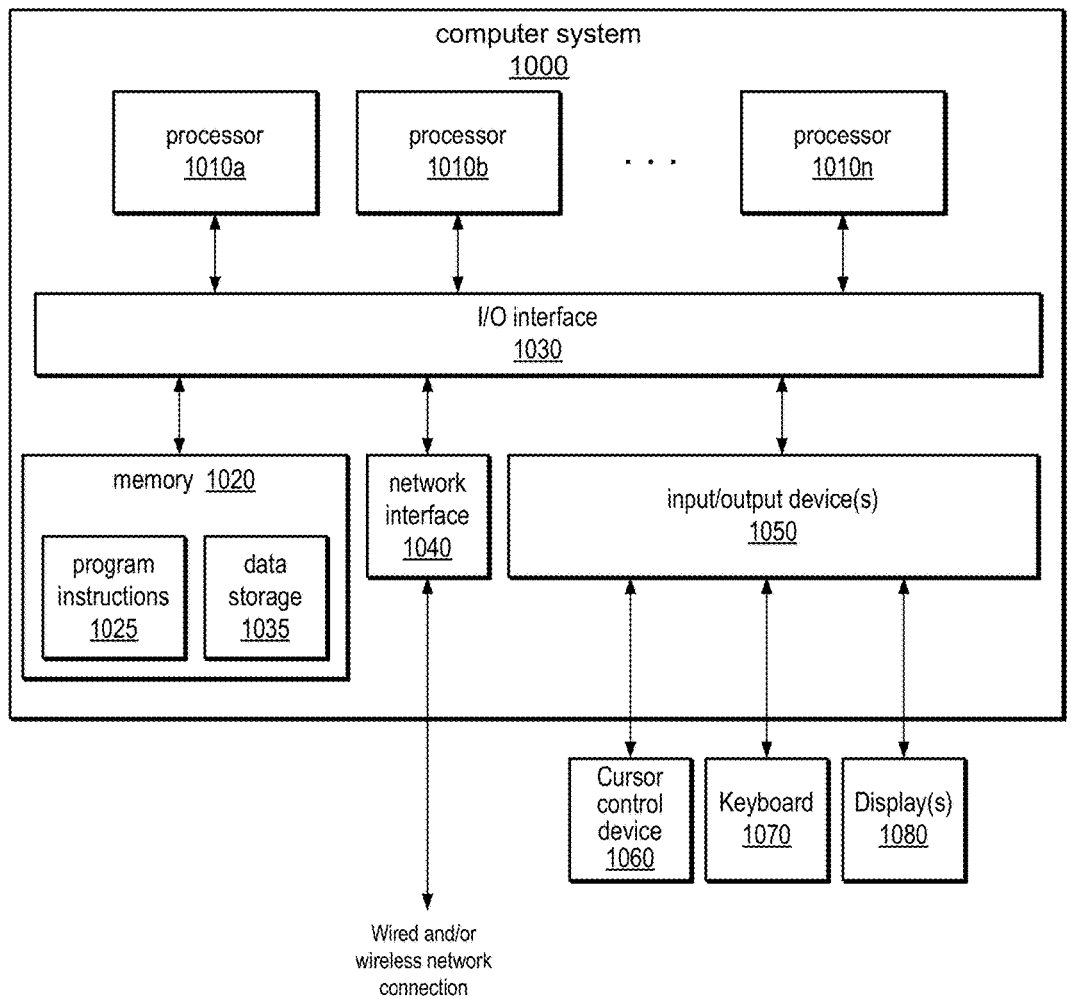
FIG. 10 depicts an example computer system that may be used in some embodiments.

FIG. 9 illustrates results of an example mesh-based transformation operation that can be used in the context of implementing preparation of casual stereoscopic video according to some embodiments. FIG. 9 shows a left transformed mesh 920 generated by calculating and applying a mesh transformation to a basic mesh as described above. A left image 910 is generated by texture mapping the pixel contents of a set of cells 930-1-1-930-M-N to left transformed mesh 920. After completion of a mesh-based transformation, the transformed mesh can be cropped or otherwise finished for use as part of a stereoscopic image pair.
Example System Embodiments of a casual stereoscopic video production module and/or of the casual stereoscopic video production techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an image rectification module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of casual stereoscopic video production module as described herein, and data storage 1035, comprising various data accessible by program instructions 1025. In one embodiment, program instructions 1025 may include software elements of embodiments of a casual stereoscopic video production module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a image rectification module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method implemented by a video system, the method comprising:
    receiving a pair of video streams, each video stream including a set of image frames captured from different perspectives, the pair of video streams including a primary video stream and a secondary video stream;
    determining removable image content for removal from at least one image frame of the set of image frames associated with the secondary video stream, said determining based on the removable image content being available from the set of image frames associated with the primary video stream;
    reducing a data size of the secondary video stream for a reduced video stream by eliminating the removable image content from the secondary video stream;
    encrypting the primary video stream using first encryption associated with a first set of digital management right (DRM) options, the first set of DRM options allowing playback of the primary video stream for two-dimensional (2D) video display;
    encrypting the reduced video stream using second encryption associated with a second set of DRM options, the second encryption being different from the first encryption, and the second set of DRM options allowing playback of the primary video stream with the reduced video stream for three-dimensional (3D) video display; and
    distributing both the primary video stream and the reduced video stream as two separate video streams to a plurality of users, the first and second encryption controlling the 2D and 3D video display by the plurality of users by:
        enabling a first set of the users associated with the first set of DRM options the playback in 2D video display; and
        enabling a second set of the users associated with the second set of DRM options the playback in 3D video display.

2. The method as recited in claim 1, wherein the removable image content available from the set of image frames associated with the primary video stream comprises the removable image content being included in the set of image frames associated with the primary video stream.

3. The method as recited in claim 1, wherein the removable image content available from the set of image frames associated with the primary video stream comprises the removable image content being predictable from the set of image frames associated with the primary video stream.

4. The method as recited in claim 1, wherein the first set of DRM options further prohibits the playback of the primary video stream with the reduced video stream for the 3D video display.

5. The method as recited in claim 1, wherein said determining of the removable image content for removal on a frame-by-frame basis comprises comparing an image frame of the primary video stream to an image frame of the secondary video stream.

6. The method as recited in claim 5, wherein said comparing the image frame of the primary video stream to the image frame of the secondary video stream comprises using a mesh-based transformation that sections the image frames for a cell-by-cell comparison of feature points in the image frames.

7. The method as recited in claim 1, further comprising associating the first and second sets of users with the first and second sets of DRM options, respectively, based on a differentiation factor.

8. The method as recited in claim 1, further comprising:
    compressing the primary video stream with first compression; and
    compressing the reduced video stream with second compression, the first compression compressing the primary video stream more than the second compression compresses the reduced video stream.

9. A video system, comprising:
    a data interface configured to receive a pair of video streams, each video stream including a set of image frames captured from different perspectives, the pair of video streams including a primary video stream and a secondary video stream;
    a memory and processor to implement a video production module configured to:
        determine removable image content for removal from at least one image frame of the set of image frames associated with the secondary video stream, the determination based on the removable image content being available from the set of image frames associated with the primary video stream;
        reduce a data size of the secondary video stream for a reduced video stream by elimination of the removable image content from the secondary video stream;
        encrypt the primary video stream using first encryption associated with a first set of digital management right (DRM) options, the first set of DRM options allowing playback of the primary video stream for two-dimensional (2D) video display;
        encrypt the reduced video stream using second encryption associated with a second set of DRM options, the second set of DRM options allowing playback of the primary video stream with the reduced video stream for three-dimensional (3D) video display;
        distribute both the primary video stream and the reduced video stream as two separate video streams to a plurality of users, the first and second encryption controlling 2D and 3D video display by the plurality of users based on associations of users with the first or second set of DRM options.

10. The video system as recited in claim 9, wherein the removable image content available from the set of image frames associated with the primary video stream comprises the removable image content being included in the set of image frames associated with the primary video stream.

11. The video system as recited in claim 9, wherein the removable image content available from the set of image frames associated with the primary video stream comprises the removable image content being predictable from the set of image frames associated with the primary video stream.

12. The video system as recited in claim 9, wherein the primary video stream is usable with the reduced video stream for a stereoscopic display of a subject captured in the image frames of the pair of video streams.

13. The video system as recited in claim 9, wherein the video production module is configured to determine the removable image content for removal on a frame-by-frame basis, the determination comprising a comparison of an image frame of the primary video stream to an image frame of the secondary video stream.

14. The video system as recited in claim 13, wherein the video production module is configured to compare the image frame of the primary video stream to the image frame of the secondary video stream comprising using a mesh-based transformation that sections the image frames for a cell-by-cell comparison of feature points in the image frames.

15. The video system as recited in claim 9, wherein the video production module is configured to:
   compress the primary video stream with first compression; and
   compress the reduced video stream with second compression, the first compression compressing the primary video stream more than the second compression compresses the reduced video stream.

16. The video system as recited in claim 15, wherein the video production module is configured to associate a first set of the users and a second set of the users with the first and second sets of DRM options, respectively, based on a differentiation factor.

17. A stereoscopic video system, comprising:
   a user interface configured to receive a selection of a pair of video streams, each video stream including a set of image frames captured from different perspectives, the pair of video streams including a right channel video stream and a left channel video stream;
   a memory and processor to implement one or more modules for video production to:
      determine removable image content for removal from at least one image frame of the set of image frames associated with the left channel video stream, the determine based on the removable image content being available from the set of image frames associated with the right channel video stream;
      reduce a data size of the left channel video stream by elimination of the removable image content from the left channel video stream;
      encrypt the left channel video stream using first encryption associated with a first set of digital management right (DRM) options, the first set of DRM options allowing playback of the left channel video stream for two-dimensional (2D) video display;
      encrypt the right channel video stream using second encryption associated with a second set of DRM options, the second set of DRM options allowing playback of the left channel video stream with the right channel video stream for three-dimensional (3D) video display;
      distribute both the right channel video stream and the left channel video stream as two separate video streams to a plurality of users, the plurality of users including a first set of the users and a second set of the users, the first and second sets of users permitted to decrypt the first and second encryption, respectively, based on a differentiation factor.

18. The stereoscopic video system as recited in claim 17, wherein decryption of the first encryption enables the playback in the 2D video display by the first set of users, and decryption of the second encryption enables the playback in the 3D video display by the second set of users.

19. The stereoscopic video system as recited in claim 17, wherein decryption of the second encryption enables the playback in the 2D video display and the playback in the 3D video display at different times by the second set of users.

20. The stereoscopic video system as recited in claim 17, wherein the right channel video stream is usable with the left channel video stream for the stereoscopic video display of a subject captured in the image frames of the pair of video streams.

21. The stereoscopic video system as recited in claim 17, wherein the one or more modules for video production are configured to determine the removable image content for removal on a frame-by-frame basis, the determination comprising a comparison of an image frame of the right channel video stream to an image frame of the left channel video stream.

22. The stereoscopic video system as recited in claim 21, wherein the one or more modules for video production are configured to compare the image frame of the right channel video stream to the image frame of the left channel video stream comprising using a mesh-based transformation that sections the image frames for a cell-by-cell comparison of feature points in the image frames.

23. The stereoscopic video system as recited in claim 17, wherein the one or more modules for video production are configured to individually-compress the right channel video stream and the left channel video stream as the two separate video streams.

* * * * *